March 29, 1966  A. KOGAN  3,242,975
PROCESS AND APPARATUS FOR EFFECTING HEAT TRANSFER
Filed May 5, 1964  2 Sheets-Sheet 1

INVENTOR.
ABRAHAM KOGAN
BY
OSTROLENK, FABER, GERB & SOFFEN
ATTORNEYS

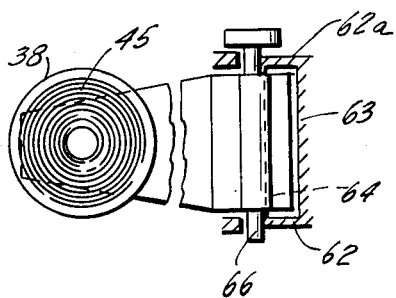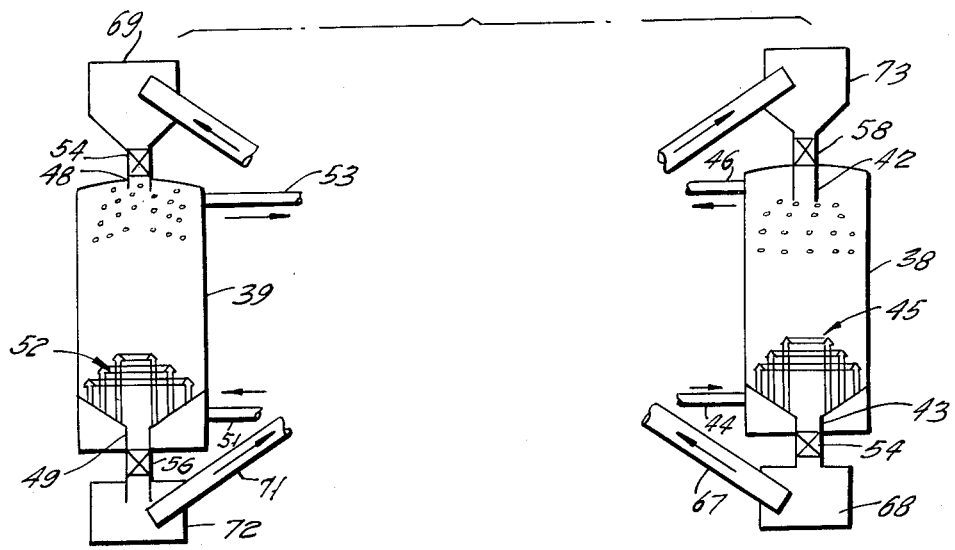

United States Patent Office
3,242,975
Patented Mar. 29, 1966

3,242,975
PROCESS AND APPARATUS FOR EFFECTING
HEAT TRANSFER
Abraham Kogan, % Dept. of Aeronautical Engineering,
The James Forrestal Hospital Research Center, Princeton, N.J.
Filed May 5, 1964, Ser. No. 365,077
6 Claims. (Cl. 165—2)

This invention relates to a heat exchanger and to a process for effecting heat exchange, which are particularly useful in the conversion of seat water to potable water.

The present invention broadly relates to a process which provides substantial heat transfer between two fluids of different temperatures. While the invention may thus be utilized in connection with any process in which fluid-fluid heat exchange is desired, it is particularly valuable for the desalination of seat water. The following description has accordingly been principally directed to preferred embodiments of the invention used in desalination operations. However, as noted above, it will be understood that this invention includes within its scope any procedure or apparatus for effecting heat exchange between fluid streams as may be embraced within the claims appended hereto.

In water desalination procedures utilizing distillation operations, water vapor emanating from a stream of hot brine condenses at one side of a metallic heat transfer surface, while cold brine is circulated adjacent the opposite side of such surface to recover the latent heat of condensation. In the case of procedures utilizing long tube vertical evaporators, such heat is utilized to evaporate water from the colder brine at a lower pressure, whereas in procedures utilizing multiple-flash evaporation, the heat is utilized to raise the temperature of the cold brine in successive stages prior to its introduction into the flashing side of the evaporator.

The temperature drop across the metallic heat transfer surfaces is an important constituent of the thermodynamic loss in such a procedure. Moreover, the cost of heat exchanger tubing accounts for the major part of capital investment in water desalination plants utilizing such operations.

Direct contact evaporation procedures have heretofore been suggested to effect water desalination without metallic heat transfer surfaces, in order to overcome the disadvantages referred to above. Such procedures involve maintaining streams of cold converted (desalinated) water and hot brine in open channels in a common enclosure, so that the water vapor leaving the hot brine is condensed by direct contact with the cold converted water. One such procedure is disclosed in my copending application Serial No. 327,946, entitled Process and Apparatus for Sea Water Conversion, filed December 4, 1963.

In such processes the latent heat of condensation is transmitted directly to the converted water stream. However, in order to recover such heat a secondary heat exchange apparatus must be employed to effect heat transfer between the hot converted water and additional cold brine feed.

It will be understood that the direct distillation procedure, which avoids the necessity for the use of metallic heat transfer surfaces in the primary transfer of heat from the hot brine, would be uneconomical if the secondary heat transfer from the hot converted water stream to the cold brine feed were effected by conventional heat exchangers utilizing metallic heat transfer surfaces.

Processes have therefore been suggested in which the secondary heat transfer is also effected without the use of metallic heat transfer surfaces. Such procedures are disclosed, for example, in papers appearing in Chemical and Process Engineering, November 1962, pages 564–571 and Chemical Engineering Progress, volume 57, No. 1, January 1961, pages 52–57. In these methods, the hot converted water is brought in direct liquid-liquid contact with a spray of a secondary fluid, which is immiscible with water and differs from it in specific gravity. After the heat exchange, the secondary fluid is separated from the converted water by gravity and then sprayed into the stream of cold brine, to which it surrenders the heat by direct contact.

While the above method eliminates the capital cost of metallic heat exchangers, it entails the use of equipment of considerable size for separating the secondary immiscible liquid, since the small droplet dimensions and relatively small differences in specific gravity attainable with practical liquids make the separation process quite slow and inefficient.

Moreover, the secondary heat exchange fluids employed have specific heats which vary considerably with temperature. When such a secondary fluid is contacted, at a constant flow rate, with the hot converted water, the temperature difference between the fluid streams may vary widely along the length of the heat exchanger. Hence, even if the temperature of the water and the secondary fluid closely approximate one another at one end of the heat exchanger column, a marked temperature differential may result at the opposite end of such column, adversely affecting the economy of the system.

It is accordingly among the objects of the present invention to provide a heat exchanger which does not utilize conventional fixed metallic heat transfer surfaces and which is economical to construct and operate to produce heat exchange between fluid streams of varying temperature.

A further object of the invention is to provide a process for effecting heat exchange between fluid streams, employing an intermediate heat transfer medium which is capable of efficient heat transfer between such fluids, and without intermingling the fluid streams by means of such medium.

Still a further object of the invention is to provide economically attractive improvements in the aforesaid procedure for the conversion of sea water to potable water by direct contact evaporation.

In accordance with the present invention, I have found that improved heat transfer may be effected between a pair of fluid streams, e.g., a stream of warm converted water recovered from a multi-stage direct contact evaporation procedure and a feed stream of cool brine therefor, by successively employing a transportable pebble bed as a direct contact heat transfer means between the fluid streams, and passing a third fluid stream through the pebble bed after it has been so utilized, to remove any of the second fluid adsorbed on or wetting the individual pebble particles and thereby promote heat transfer without intermixing of the respective fluids. The use of the pebble bed as an intermediate heat sink thus provides efficient indirect heat transfer between the separate fluid streams and this without contamination of one stream, e.g., converted potable water, with the other, e.g., a brine feed stream.

Specifcaly, the apparatus utilized to effect such heat exchange includes a transportable pebble bed constituted of a fluent mass of pebble particles, a first pebble chamber into and through which the pebble particles are fed, mechanism for feeding a first fluid stream, e.g., converted water, into the first pebble chamber and distributing the same across the cross-section thereof in contact with the pebble particles, and mechanism for removing the first fluid stream from such pebble chamber. A second pebble chamber communicates with the first such chamber and receives the pebble particles transported from the first chamber. Mechanism is additionally provided for feeding a second fluid stream, e.g., a brine stream, into the second chamber and distributing the same across the cross-section thereof in contact with the pebble particles passed therethrough. The pebble particles, to which heat is first transferred from the first fluid stream and from which heat is thereafter transferred to the second fluid stream, are thereafter recycled to the first pebble chamber by suitable transport mechanism. Finally, mechanism is provided, associated with the transport mechanism, for passing a third fluid stream, e.g., pure water, in contact with the pebble particles recycled to the first pebble chamber, in order to remove any of the second fluid adsorbed on or wetting such particles and thereby prevent intermixing of the first and second fluid streams.

The pebble bed, as indicated above, is constituted of a fluent mass of particles designed to effect heat transfer between the respective fluid streams. The individual "pebbles" may be constituted of any solid material of flowable size and form, having heat capacity and conductivity characteristics such as to effect heat transfer to and from aqueous streams. The pebbles are preferably substantially spherical and relatively uniform in size, but may be rod shaped or irregular in size or shape. Good results may be obtained employing, as pebble materials, substances having specific gravities of from about 2 to 10 grams/cc. and specific heats and coefficients of thermal conductivity sufficient, as noted above, to effect heat transfer to and from aqueous streams. When employed in desalination procedures, for example, the pebbles may suitably comprise metal balls composed of nickel, stainless steel or other non-rusting materials, or mineral particles constituted of granite, basalt, etc.

The respective pebble chambers in which heat is transferred to, and received from, the pebble bed may be arranged in either vertically or horizontally displaced relation. It is preferred to dispose the first pebble chamber above the second pebble chamber in order to facilitate direct gravity feed of the pebble bed from the first to the second chamber. In such case, the pebble chambers are connected by a vertical conveyor or elevator which recycles the pebble particles from the second to the first pebble chamber. Alternatively, when the pebble chambers are disposed in horizontal relation, other suitable conveyor means may be provided for transporting the pebble particles from one to the other of the respective chambers.

The nature and objects of the invention will be more fully apparent from the following detailed description of preferred embodiments thereof, taken in connection with the accompanying drawings in which:

FIGURE 2 is a horizontal cross-section taken along the line 2—2 of FIGURE 1; and FIGURE 3 is a schematic elevation of a modified form of the heat exchanger hereof.

Figure 1:
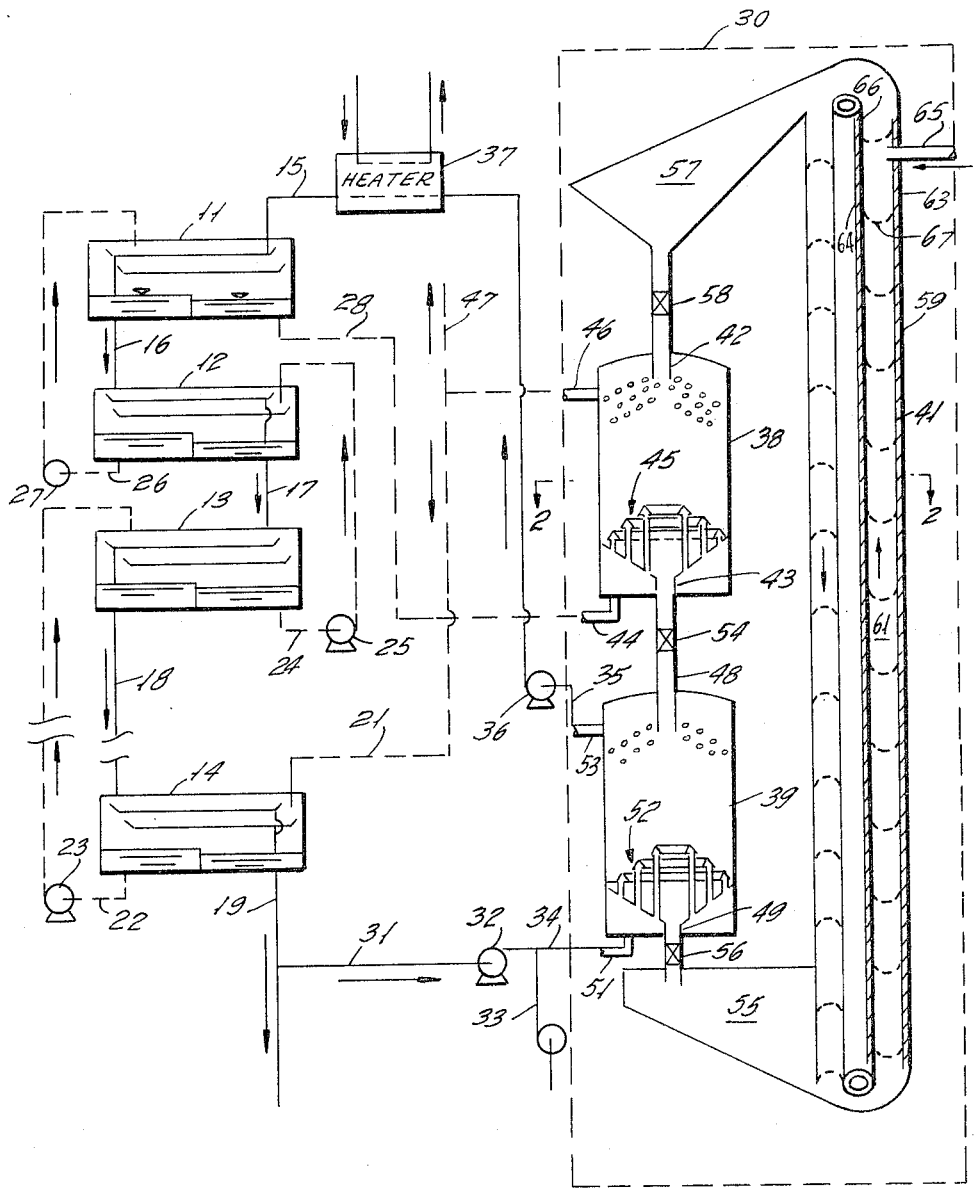
FIGURE 1 is a flow diagram of a plant for effecting saline water conversion, including a schematic elevation of a preferred form of the heat exchanger of the present invention.

In the drawings a plurality of reservoirs 11, 12, 13 and 14 are illustrated (FIGURE 1), representing successive stages of a multi-stage desalination system for evaporating brine and condensing converted water produced therefrom. The structure of the individual reservoirs, in which direct contact evaporation occurs, is described more fully in the aforesaid copending application Serial No. 327,946, the disclosure of which is incorporated herein by reference.

Heated brine is initially fed into the first stage reservoir 11 through inlet line 15, and then passed through the successive direct contact evaporation stages. As indicated by solid line in FIGURE 1, the brine thus passes successively from the first stage 11 through line 16 into stage 12, from stage 12 through line 17 into stage 13, and from stage 13 through line 18. It will be understood that the brine may be passed through one or more further direct contact evaporation stages (not shown in the drawing) before being fed into the final stage 14. The brine is finally removed from the final stage through outlet line 19.

A stream of converted water is fed countercurrent to the brine stream through the successive stages of the multi-stage system. The converted water, the flow of which is indicated in FIGURE 1 by dashed lines, is initially fed through line 21 to the final stage 14, removed from stage 14 through line 22 and fed by pump 23 through such further stages (not illustrated) as may be desired. The converted water stream is then fed to stage 13, removed from stage 13 through line 24 and fed by pump 25 to stage 12 and removed from stage 12 through line 26 and fed by pump 27 to the first stage 11, from which the product converted water stream is removed through outlet line 28.

As pointed out in the aforesaid prior application, since the brine flowing through the successive stages is at a somewhat higher temperature than the converted water flowing countercurrent thereto, vapor may be flashed from the brine and condensed at the free surfaces of the converted water stream. The converted water thus leaves each successive stage at a somewhat higher temperature than its temperature of inflow. A corresponding decrease in the brine temperature occurs during the passage of the brine through the successive stages 11, 12, 13, etc. As a net result, a stream of concentrated and relatively cool brine emerges from the final stage 14 through outlet line 19, whereas a stream of relatively warm converted water leaves the first stage 11 through outlet line 28.

A portion of the cold concentrated brine stream removed through line 19 is fed through line 31 by pump 32 and mixed with a stream of fresh saline water introduced through line 33. The composite brine stream is fed through line 34 into a heat exchanger 30 provided in accordance with the present invention, described more fully below. The brine stream is removed from the heat exchanger and recycled through exit line 35 by pump 36, entering heater 37 and returning through inlet line 15 to the first stage 11 of the multi-stage direct contact system.

The preferred form 30 of the heat exchanger of the present invention (FIGURE 1) includes a first pebble chamber 38, a second pebble chamber 39 and a conveyor 41 communicating with the respective pebble chambers.

The pebble chamber 38 is provided with a pebble admission pipe 42, a pebble exit pipe 43, a converted water inlet pipe 44, a converted water distribution manifold 45 and a converted water outlet pipe 46. The converted water stream is fed to inlet pipe 44 through line 28 and removed through outlet pipe 46 to product line 47. A further portion of the stream exiting outlet pipe 46 is recycled to the final stage 14 of the desalination system through line 21.

The second pebble chamber 39 is provided with a pebble admission pipe 48, a pebble exit pipe 49, a brine inlet pipe 51, a brine distribution manifold 52, and a brine outlet pipe 53. The brine inlet pipe 51 is connected with the composite brine feed stream through line 34, and the brine outlet pipe 53 is connected through exit line 36 with the multi-stage desalination system.

The pebble admission pipe 48 to the second pebble chamber is connected to the pebble exit pipe 43 from the first pebble chamber through valve 54, and the pebble exit pipe 49 of the second pebble chamber communicates with an intake chamber 55 of the conveyor 41.

The conveyor 41 is arranged for transporting the pebble particles from the second pebble chamber 39 to the first pebble chamber 38. Thus, the intake chamber 55 of the conveyor is connected to the pebble exit pipe 49 at the base of the second pebble chamber through a valve, 56, and a conveyor outlet chamber 57 is connected to the pebble admission pipe 42 above the first pebble chamber through a valve 58.

The conveyor 41 is mounted within an external housing 59, the ascending flight 61 of the conveyor being mounted within an open-ended duct defined by the walls 62, 62a and 63 of the housing and partition 64 closely spaced from the flight itself (see FIGURES 1 and 2). A water feed pipe 65 extends through the wall 63 of the outer housing 59 into the duct thus defined.

The conveyor 41 shown may be of any conventional type suitable for continuously or intermittently elevating and transporting the pebble particles from the second pebble chamber 39 to the first pebble chamber 38. As illustrated, a conveyor mechanism including a continuous belt or chain drive 66 carrying a number of perforated bucket elements 67 has been found particularly suitable.

In operation, converted hot water removed from the multi-stage evaporation system through line 28 enters the distribution manifold 45 through inlet pipe 44, is distributed over substantially the entire cross-section of the first pebble chamber 38 and flows upward towards the water outlet pipe 46.

The pebble particles moving downwardly through the first pebble chamber 38 come in direct contact with the upwardly directed hot fluid stream, effecting countercurrent heat exchange therebetween. The cold pebbles entering at the upper part of the chamber 38 through pipe 42 thus emerge hot from pipe 43, while the hot converted water entering through pipe 44 is cooled upon emergence through outlet pipe 46. In this manner, in one illustrative case converted water can be cooled from about 220° F. to 70° F.

The heated pebble particles enter the second pebble chamber 39 through pipe 48, where they move countercurrent to the cold brine stream fed upwardly through the second pebble chamber from the distribution manifold 52. A countercurrent heat exchange between the heated pebble particles and the cool brine thus takes place in the chamber 39, the pebbles emerging with a low temperature through the outlet pipe 49 and the brine stream emerging at an elevated temperature through the exit pipe 53. In the illustration given above, the brine stream can be heated in this manner from a temperature of about 65° F. to 215° F.

The pebble particles move through pipe 49 into the intake chamber 55 of the conveyor 41 and are thereafter transported by the conveyor to the outlet chamber 57, from which they proceed by gravity flow to the first pebble chamber 38 for a further cycle.

The transport of the pebble bed downward from the outlet chamber 57 through the pebble chambers 38 and 39 and into the intake chamber 55 is thus maintained by gravity. The flow of converted water from the inlet pipe 44 through the first pebble chamber 38 to the outlet pipe 46, and the flow of brine from inlet pipe 51 through the second pebble chamber 39 to the outlet pipe 53, is maintained by suitable pumping means, not shown in the drawing. In order to prevent flow of the brine stream through pipe 48 into the first pebble chamber the pressures of the respective streams are adjusted such that the pressure of the converted water entering the first pebble chamber 38 through manifold 45 is somewhat higher than the pressure of the brine emerging from the second pebble chamber 39 through pipe 53.

Any brine adsorbed on the individual pebble particles in the second pebble chamber 39 is removed, pursuant to the invention, by feeding a pure, e.g., a converted, water stream through pipe 65 into the inner housing abutting the ascending flight 61. Since the inner housing closely abuts the ascending flight of the conveyor 41, the converted or other pure water fed therethrough must pass downwardly through the perforations in the individual bucket elements 67 of the conveyor which are of such dimensions as to prevent the build-up of excessive pressure differentials vertically of the conveyor. The water thus thoroughly washes the individual pebbles transported by conveyor 41 and maintains a slow downflow through the conveyor interior housing and into the chamber 55. The pebbles carried by the ascending flight of the conveyor are thus washed free of brine prior to entering the first pebble chamber 38. In this manner brine is prevented from entering the first pebble chamber and admixing with the pure converted water passed therethrough.

An alternative embodiment of the heat exchanger 30 of the present invention is illustrated in FIGURE 3 of the drawings. In the illustrated device, the pebble chambers 38 and 39 are positioned at the same level with respect to one another, horizontally displaced from one another. Instead of a single conveyor connecting the outlet of the second pebble chamber with the inlet of the first pebble chamber, a pair of conveyors are provided, a first conveyor 67, e.g., a screw conveyor, elevating the pebble particles from a hopper 68 disposed adjacent the base of the first pebble chamber 38 to a hopper 69 disposed adjacent the inlet pipe 48 to the second pebble chamber 39. A second, similar conveyor 71 is also provided for transporting the pebble particles from a hopper 72 adjacent the base of the second pebble chamber 39 to a hopper 73 disposed adjacent the inlet pipe 42 to the first pebble chamber 38.

The casing of the conveyor 71, in which the pebble particles are elevated from the second pebble chamber 39 to the first pebble chamber 38, is flooded with converted or other pure water to a level sufficient to maintain a slow flow of water downwardly toward the pebble chamber 39. As noted above, the pebble bed is thus washed and any brine film formed on the individual pebbles is removed prior to feeding the same into the first pebble chamber 38 for heat exchange with the previously converted hot water stream.

It will be noted that the present invention provides novel apparatus for effecting heat exchange between a pair of fluid streams, and an efficient process for such purpose, without requiring equipment entailing high capital costs. Moreover, the present invention effects such result employing an indirect liquid-liquid system in which dissolved ingredients from one fluid stream are prevented from contacting and thus contaminating the second fluid stream in heat exchange relation therewith.

As indicated hereinabove the configuration of the heat exchanger of the present invention may, for example, be varied without departing from the scope of the present invention. Since this and other changes may be made in the preferred embodiments described above, it is intended that the preceding description be interpreted as illustrative only and not in a limiting sense.

I claim:
1. An apparatus for effecting heat exchange between at least a first, relatively warm converted water stream and a second, relatively cool brine stream, which comprises:
 (a) a transportable pebble bed constituted of a fluent mass of a pebble material having a specific gravity of between 2 to 10 and heat transfer characteristics sufficient to promote the transfer of heat from said relatively warm converted water stream to said relatively cool brine stream;
 (b) a first pebble chamber;
 (c) a pebble admission pipe for feeding the pebble particles downwardly into and through said first pebble chamber;
 (d) an inlet pipe for feeding the stream of warm converted water upwardly into and through the first pebble chamber, and a first distribution manifold for distributing the converted water stream uniformly over the cross-section of the first pebble chamber during upward passage of such stream through the downwardly moving pebble particles;
 (e) an outlet pipe for removing the cooled converted water stream from the first pebble chamber;

(f) a second pebble chamber disposed vertically below the first pebble chamber for receiving the heated pebble particles therefrom;

(g) an inlet pipe connecting the first pebble chamber to the second pebble chamber for feeding the pebble particles by gravity feed therebetween;

(h) a brine inlet pipe for feeding the cool brine stream upwardly into and through the second pebble chamber, and a second distribution manifold for distributing the brine stream uniformly over the cross-section of the second pebble chamber during upward passage of such stream through the downwardly moving pebble particles;

(i) an outlet pipe for removing the heated brine stream from the second pebble chamber; and (j) a vertically disposed conveyor having an inlet portion communicating with the second pebble chamber and an outlet portion communicating with the first pebble chamber for feeding the pebble particles from the second to the first pebble chamber, said conveyor including means for feeding a pure water stream downwardly through said conveyor to thereby effect removal of any brine adsorbed on said particles therefrom.

2. The heat exchange apparatus as set forth in claim 1, in which said conveyor includes:

(1) a continuous driven member movable substantially in the vertical plane from a first position aligned with the first pebble chamber to a second position aligned with the second pebble chamber;

(2) an inlet chamber communicating with the second pebble chamber and disposed adjacent the first position of said driven member;

(3) an outlet chamber communicating with the pebble admission pipe to the first pebble chamber and disposed adjacent the second position of said driven member;

(4) a plurality of perforated buckets mounted on said member for transporting the pebble particles from said inlet chamber to said outlet chamber;

(5) a housing enclosing and closely spaced from the ascending flight of said conveyor; and (6) an inlet pipe connected to said housing adjacent its upper end for flooding said housing with converted water to remove brine from the individual pebble particles elevated by said driven member.

3. A process for effecting heat exchange between a first, relatively warm converted water stream and a second, relatively cool brine stream, which comprises:

(a) transporting a pebble bed constituted of a fluent mass of pebble particles, whose heat transfer characteristics are such as to receive heat from the warm converted water stream and transfer the same to the cool brine stream, downwardly through a first heat transfer zone;

(b) feeding the warm converted water stream upwardly through said first heat transfer zone counter-current to said pebble bed, the converted water coming in intimate contact with the individual pebble particles to effect heat transfer thereto;

(c) transporting the thus heated pebble bed into a second heat transfer zone and moving said pebble bed downwardly through said zone;

(d) feeding the cool brine stream upwardly through said second heat transfer zone countercurrent to said pebble bed, the brine coming in intimate contact with the individual pebble particles to effect heat transfer from said particles to the brine;

(e) removing the heated brine from the second heat transfer zone;

(f) transporting the cooled pebble bed from the base of the second heat transfer zone to the upper portion of the first heat transfer zone for a further cycle; and (g) feeding a stream of converted water downwardly through and countercurrent to said pebble bed during step (f), the converted water coming in intimate contact with the individual pebble particles to remove any of the brine absorbed on said particles therefrom and thereby facilitate heat transfer between the warm converted water stream and the cool brine stream without intermixing thereof.

4. In a multi-stage procedure for the conversion of saline to potable water involving feeding a first, relatively warm brine stream and a second relatively cool converted water stream in countercurrent flow through open channels in a common enclosure, evaporating water vapor from said brine stream, and condensing said vapor by direct contact with the converted water stream, a relatively cool brine stream emerging from the last stage of such procedure and a relatively warm converted water stream emerging from the initial stage of said procedure, the improvement comprising effecting heat exchange between said relatively warm converted water stream and said relatively cool brine stream by:

(a) transporting a pebble bed constituted of a fluent mass of pebble particles, whose heat transfer characteristics are such as to receive heat from the warm converted water stream and transfer the same to the cool brine stream, downwardly through a first heat transfer zone;

(b) feeding the warm converted water stream upwardly through said first heat transfer zone countercurrent to said pebble bed, the converted water coming in intimate contact with the individual pebble particles to effect heat transfer thereto;

(c) transporting the thus heated pebble bed into a second heat transfer zone and moving said pebble bed downwardly through said zone;

(d) feeding the cool brine stream upwardly through said second heat transfer zone countercurrent to said pebble bed, the brine coming in intimate contact with the individual pebble particles to effect heat transfer from said particles to the brine;

(e) removing the heated brine from the second heat transfer zone;

(f) transporting the cooled pebble bed from the base of the second heat transfer zone to the upper portion of the first heat transfer zone for a further cycle; and (g) feeding a stream of converted water downwardly through and countercurrent to said pebble bed during step (f), the converted water coming in intimate contact with the individual pebble particles to remove any of the brine adsorbed on said particles therefrom and thereby facilitate heat transfer between the warm converted water stream and the cool brine stream without intermixing thereof.

5. An apparatus for effecting heat exchange between at least a first, relatively warm converted water stream and a second, relatively cool brine stream, which comprises:

(a) a transportable pebble bed constituted of a fluent mass of pebble particles having heat transfer characteristics sufficient to permit the transfer of heat from said relatively warm converted water stream to said relatively cool brine stream;

(b) a first pebble chamber;

(c) a pebble admission pipe for feeding the pebble particles into and through said first pebble chamber;

(d) an inlet pipe for feeding the stream of warm converted water into the first pebble chamber, and a first distribution manifold for distributing the converted water stream uniformly over the cross-section of the first pebble chamber into contact with the pebble particles fed therethrough;

(e) an outlet pipe for removing the cooled converted water stream from the first pebble chamber;

(f) a second pebble chamber communicating with said first chamber;

(g) an inlet pipe connecting the first pebble chamber to the second pebble chamber, for feeding the pebble particles from the first to the second chamber;

(h) a brine inlet pipe for feeding the cool brine stream into the second pebble chamber, and a second distribution manifold for distributing the brine stream uniformly over the cross-section of the second pebble chamber during contact of such stream with the pebble particles passed therethrough;

(i) an outlet pipe for removing the heated brine stream from the second pebble chamber; and (j) a conveyor having an inlet portion communicating with the second pebble chamber and an outlet portion communicating with the first pebble chamber, for feeding the pebble particles from the second to the first chamber, said conveyor including means for feeding a pure water stream through the conveyor to thereby effect removal of any brine absorbed on said particles therefrom.

6. A process for effecting heat exchange between a first, relatively warm converted water stream, and a second, relatively cool brine stream, which comprises:

(a) feeding said relatively warm converted water stream longitudinally through a first heat exchange zone countercurrent to the flow of and in intimate contact with a transportable pebble bed constituted of a fluid mass of pebble particles whose heat transfer characteristics are such as to promote heat transfer from the relatively warm converted water stream to the relatively cool brine stream;

(b) transporting the thus heated pebble bed from said first head exchange zone into a second heat exchange zone and transporting the pebble bed longitudinally through said second zone;

(c) feeding said relatively cool brine stream longitudinally through said second heat exchange zone countercurrent to and in intimate contact with the heated pebble bed to effect heat transfer from said pebble bed to the brine stream;

(d) removing said brine stream from said second heat exchange zone;

(e) transporting the thus cooled pebble bed from the second heat exchange zone to the first heat exchange zone for further heat transfer as set forth in step (a) above; and (f) feeding a stream of converted water through said cooled pebble bed during step (e) to remove any of the brine adsorbed on the individual pebble particles of said bed therefrom.

References Cited by the Examiner

UNITED STATES PATENTS 3,104,955  9/1963  Marchand _____ 165—106 X

FOREIGN PATENTS 662,211  12/1951  Great Britain.
701,544  12/1953  Great Britain.

FREDERICK L. MATTESON, Jr., *Primary Examiner.*

ROBERT A. O'LEARY, *Examiner.*

N. R. WILSON, *Assistant Examiner.*